United States Patent
Kommula et al.

(10) Patent No.: US 11,968,251 B1
(45) Date of Patent: Apr. 23, 2024

(54) SELF-LEARNING SERVICE SCHEDULER FOR SMART NICS

(71) Applicant: Juniper Networks, Inc., Sunnyvale, CA (US)

(72) Inventors: Raja Kommula, Cupertino, CA (US); Ganesh Byagoti Matad Sunkada, Bengaluru (IN); Thayumanavan Sridhar, Sunnyvale, CA (US); Rajasree Krishnamoorthy, Fremont, CA (US); Raj Yavatkar, Los Gatos, CA (US); Jit Gupta, Philadelphia, PA (US); Krishna Kant, Philadelphia, PA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/064,803

(22) Filed: Dec. 12, 2022

(51) Int. Cl.
*H04L 67/1008* (2022.01)
*H04L 41/16* (2022.01)

(52) U.S. Cl.
CPC .......... *H04L 67/1008* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 6,141,705 A | * | 10/2000 | Anand | G06F 9/5044 718/107 |
| RE37,811 E | * | 7/2002 | Sitbon | G06F 9/5083 713/1 |
| 9,571,391 B2 | | 2/2017 | Tsiatsis et al. | |
| 2005/0120095 A1 | * | 6/2005 | Aman | H04L 67/1008 709/219 |
| 2006/0136701 A1 | * | 6/2006 | Dickinson | G06F 8/61 712/205 |

(Continued)

FOREIGN PATENT DOCUMENTS

WO 2013/184846 A1 12/2013

OTHER PUBLICATIONS

Adarsh, "Autonomous and Predictive Systems to Enhance the Performance of Resilient Networks", University of California, Santa Barbara, Sep. 30, 2022, 268 pp.

(Continued)

*Primary Examiner* — Joshua Joo
(74) *Attorney, Agent, or Firm* — Shumaker & Sieffert, P.A.

(57) ABSTRACT

An example method comprises determining, by an edge services controller, based on a respective predicted resource utilization value for each of a plurality of servers, a corresponding server weight for each of the plurality of servers; the plurality of servers comprising respective network interface cards (NICs), wherein each NIC of the plurality of NICs comprises an embedded switch and a processing unit coupled to the embedded switch; determining, by the edge services controller, based on a respective predicted resource utilization value for each of a plurality of services, a corresponding application weight for each of the plurality of services; and scheduling, by the edge services controller, based on the respective server weight for a server of the plurality of servers and the respective application weight for the service, a service of the plurality of services on the server.

20 Claims, 11 Drawing Sheets

(56) References Cited

U.S. PATENT DOCUMENTS

| | | | |
|---|---|---|---|
| 2018/0359544 A1* | 12/2018 | Sagie | H04Q 11/0062 |
| 2019/0243691 A1* | 8/2019 | LaBute | G06F 9/5077 |
| 2020/0019444 A1* | 1/2020 | Rao | G06F 9/5016 |
| 2020/0106856 A1* | 4/2020 | Megahed | G06F 16/24578 |
| 2021/0004258 A1* | 1/2021 | Liu | H04L 67/10 |
| 2021/0037363 A1* | 2/2021 | Yang | H04L 41/5054 |
| 2022/0129316 A1* | 4/2022 | Sheoran | G06F 9/5027 |
| 2022/0382593 A1 | 12/2022 | Tootaghaj et al. | |

OTHER PUBLICATIONS

Extended Search Report from counterpart European Application No. 23215625.7 dated Feb. 27, 2024, 10 pp.

* cited by examiner

| Time | Day (N-2) | | | | | Day (N-1) | | | | | Today | | | | |
|---|---|---|---|---|---|---|---|---|---|---|---|---|---|---|---|
| | CPU Usage | Network Usage % | DPU Usage | Num Jumbo | Num Firewall | CPU Usage | Network Usage % | DPU Usage | Num Jumbo | Num Firewall | CPU Usage | Network Usage | DPU Usage | Num Junbo | Num Firewall |
| T1 | 30 | 20 | 5 | 5100 | 70 | 24 | 30 | 8 | 4500 | 68 | ? | ? | ? | ? | ? |
| T2 | 20 | 18 | 12 | 2900 | 50 | 32 | 28 | 25 | 5300 | 29 | ? | ? | ? | ? | ? |
| T3 | 70 | 50 | 35 | 10500 | 110 | 56 | 47 | 28 | 9750 | 105 | ? | ? | ? | ? | ? |
| | | | | | | | | | | | | | | | |

FIG. 10

| Time | DPU-1 | | DPU-2 | | | | DPU-3 | | | |
|---|---|---|---|---|---|---|---|---|---|---|
| | Sw | Aw(S1-1) | Sw | A(S3-1) | A(S1-2) | A(S2-1) | Sw | A(S4-1) | A(S3-2) | A(S2-2) |
| t | 7 | 4 | 6 | 7 | 6 | 4 | 5 | 3 | 2 | |
| t + Dt1 | 5 | 6 | 4 | 6 | 7 | 8 | 9 | 7 | 5 | |
| t + Dt2 | 8 | 5 | 5 | 5 | 5 | 5 | 6 | 4 | 3 | |
| t + Dt3 | 4 | 9 | 7 | 8 | 7 | 8 | 8 | 6 | 4 | 7 |

FIG. 11

SELF-LEARNING SERVICE SCHEDULER FOR SMART NICS

TECHNICAL FIELD

The disclosure relates to computer networks.

BACKGROUND

In a typical cloud-based data center environment, a large collection of interconnected servers provide computing and/or storage capacity to run various applications. For example, a data center may comprise a facility that hosts applications and services for subscribers, i.e., customers of a data center provider. The data center may, for example, host all of the infrastructure equipment, such as networking and storage systems, redundant power supplies, and environmental controls. In a typical data center, clusters of storage servers and application servers (compute nodes) are interconnected via a high-speed switch fabric provided by one or more tiers of physical network switches and routers. More sophisticated data centers provide infrastructure spread throughout the world with subscriber support equipment located in various physical hosting facilities.

Connectivity between the server and the switch fabric is provided by a hardware module called a Network Interface Card (NIC). A conventional NIC includes an application-specific integrated circuit (ASIC) to perform packet forwarding, which includes some basic Layer 2/Layer 3 (L2/L3) functionality. In conventional NICs, the packet processing, policing and other advanced functionality, known as the "datapath," is performed by the host CPU, i.e., the CPU of the server that includes the NIC. However, some NIC vendors may include an additional processing unit in the NIC itself to offload at least some of the datapath processing from the host CPU to the NIC. The processing unit in the NIC may be, e.g., a multi-core ARM processor with some hardware acceleration provided by a Data Processing Unit (DPU), Field Programmable Gate Array (FPGA), and/or an ASIC. A processing unit may be alternatively referred to as a DPU. NICs that include such augmented datapath processing capabilities are typically referred to as SmartNICs.

SUMMARY

In general, techniques are described for an edge services platform that leverages processing units of NICs to augment the processing and networking functionality of a network of servers that include the NICs. Features provided by the edge services platform may include, e.g., orchestration of NICs; API driven deployment of services on NICs; NIC addition, deletion, and replacement; monitoring of services and other resources on NICs; and management of connectivity between various services running on the NICs. More specifically, this disclosure describes an edge services platform that implements a self-learning scheduler to determine placements of service instances based on predicted future application/service resource utilizations and server resource utilizations. The self-learning scheduler learns about resource utilization requirements of one or more services, and resource utilization patterns of hardware resources of one or more servers, including resource utilization patterns of processing units of NICs of the servers. In some examples, the edge services platform uses a machine learning model to inform scheduling of a service of the one or more services to a server of the one or more servers. The machine learning model is trained by analyzing a first set of historical utilization data for the one or more servers and a second set of historical utilization data for the one or more services. The trained machine learning model predicts resource utilization values for the one or more servers and the one or more services.

Services running in a typical enterprise data center environment may follow a predictable pattern of server compute and network resource usage. For example, administrators may schedule backup services during the overnight hours. Payroll processing software may run on a weekly, bimonthly, or monthly schedule. Branch offices may upload daily transaction data to the central office at the end of the day. A typical use case is a backup service that follows a pattern of a large number of elephant flows from servers to storage devices during the backup process. Backup software may use jumbo packets to minimize the total number of required transactions. Administrators may pre-configure a virtual local area network (VLAN) for backup traffic.

When services follow predictable resource usage patterns, these services cause predictable resource usage patterns on the servers running the services. These patterns can be used to schedule the services onto appropriate servers to utilize server resources efficiently, and to maximize the performance of the services. Traditional schedulers make scheduling decisions based on the availability of resources on each of a plurality of servers at the time of scheduling, along with one or more user-configured static scheduling policies such as server affinity and server taints.

Since traditional schedulers are not aware of future utilization trends for services and resources on the plurality of servers, high resource utilization services may be scheduled onto a server which then faces a resource deficiency subsequent to the scheduling. Likewise, one or more low resource utilization services may be scheduled onto a server for which additional resources may become available subsequent to the scheduling. These scheduling inefficiencies may result in degraded service performance or underutilization of server resources.

The techniques may provide one or more technical advantages that realize one or more practical applications. For example, in contrast to traditional schedulers, the self-learning scheduler described herein acquires knowledge about future resource requirements of services and resource availabilities of servers, including the processing units of NICs of such servers. The self-learning scheduler uses a machine learning model to make predictions of future resource requirements based on usage telemetry data relative to start times for each of the services. The self-learning scheduler uses the machine learning model to make predictions of future resource availabilities for servers based on resource usage telemetry of service instances. Based on the predicted future resource requirements and predicted future resource availabilities, the self-learning scheduler schedules a service having a high future resource requirement with a server having a high future resource availability, such that a service requiring high resources is scheduled for deployment on a server having more resources. In this way, the techniques may improve overall service performance across multiple service instances deployed to multiple servers, reduce performance bottlenecks from oversubscribed servers, and/or facilitate enhanced reliability and performance of service instances by ensuring sufficient resources for future deployments.

In one example, this disclosure describes a system comprising a plurality of servers comprising respective network interface cards (NICs), wherein each NIC of the plurality of NICs comprises an embedded switch and a processing unit coupled to the embedded switch; and an edge services controller configured to determine, based on a corresponding predicted resource utilization value for the processing unit of the corresponding NIC of each of the plurality of servers, a corresponding server weight for each of the plurality of servers; determine, based on a corresponding predicted resource utilization value for each of the plurality of services, a corresponding application weight for each of a plurality of services; and schedule a service of the plurality of services on a processing unit of the corresponding NIC of a server of the plurality of servers based on the corresponding server weight for the server and the corresponding application weight for the service.

In another example, this disclosure describes a method comprising determining, by an edge services controller, based on a respective predicted resource utilization value for each of a plurality of servers, a corresponding server weight for each of the plurality of servers; the plurality of servers comprising respective network interface cards (NICs), wherein each NIC of the plurality of NICs comprises an embedded switch and a processing unit coupled to the embedded switch; determining, by the edge services controller, based on a respective predicted resource utilization value for each of a plurality of services, a corresponding application weight for each of the plurality of services; and scheduling, by the edge services controller, based on the respective server weight for a server of the plurality of servers and the respective application weight for the service, a service of the plurality of services on the server.

In another example, this disclosure describes a non-transitory computer-readable storage medium comprising instructions that, when executed, configure processing circuitry of a computing system to perform operations comprising: determining, by an edge services controller, based on a respective predicted resource utilization value for each of a plurality of servers, a corresponding server weight for each of the plurality of servers; the plurality of servers comprising respective network interface cards (NICs), wherein each NIC of the plurality of NICs comprises an embedded switch and a processing unit coupled to the embedded switch; determining, by the edge services controller, based on a respective predicted resource utilization value for each of a plurality of services, a corresponding application weight for each of the plurality of services; and scheduling, by the edge services controller, based on the respective server weight for a server of the plurality of servers and the respective application weight for the service, a service of the plurality of services on the server.

The details of one or more embodiments of this disclosure are set forth in the accompanying drawings and the description below. Other features, objects, and advantages will be apparent from the description and drawings, and from the claims.

BRIEF DESCRIPTION OF THE DRAWINGS

FIG. 10 is a table showing an illustrative resource utilization pattern on a data processing unit.

FIG. 11 is a table showing a server and application weight matrix for multiple data processing units of servers, at each of a plurality of different time stamps.

Like reference characters denote like elements throughout the description and figures.

DETAILED DESCRIPTION

Figure 1:
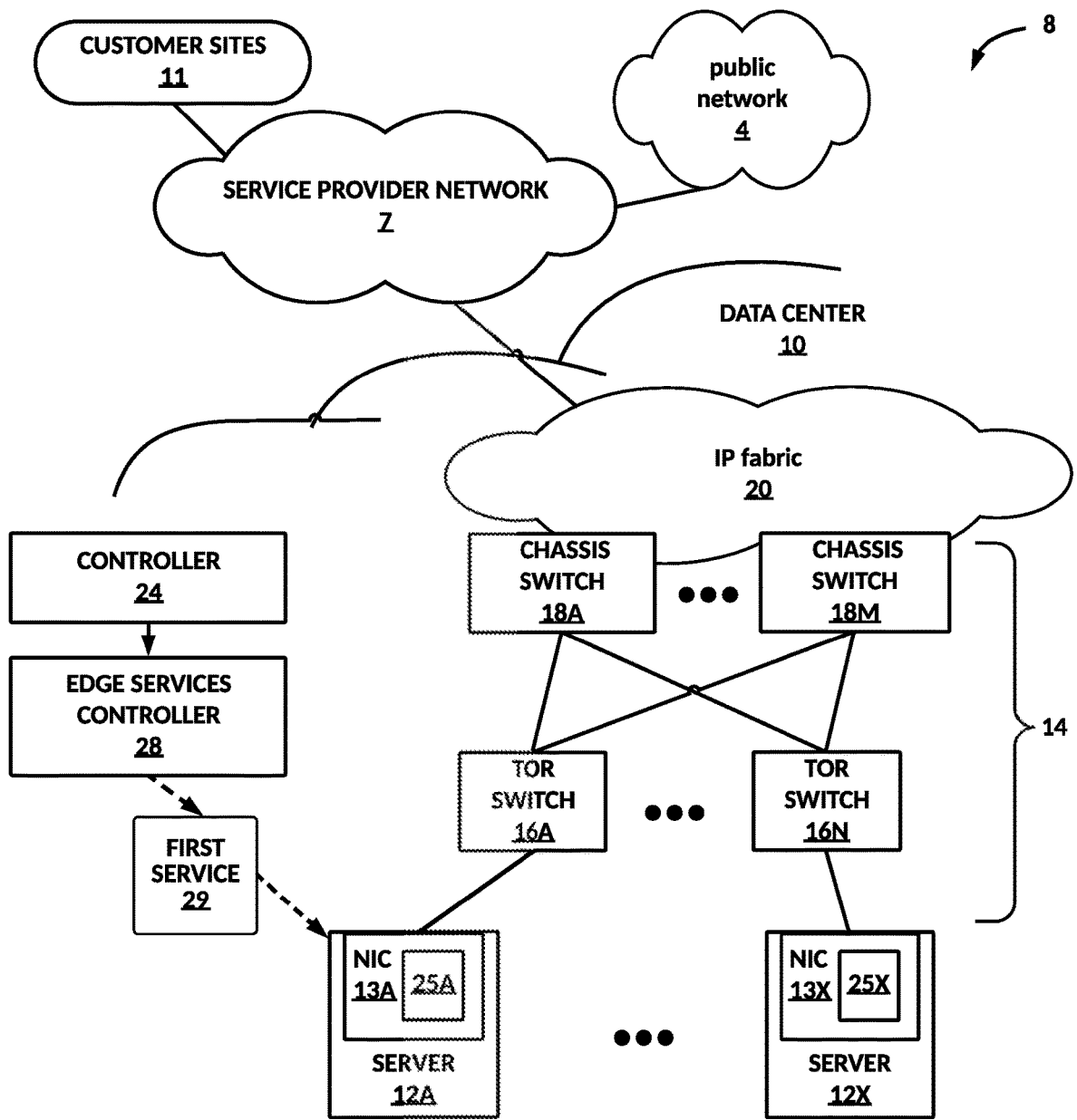
FIG. 1 is a block diagram illustrating an example network system having a data center in which examples of the techniques described herein may be implemented.

FIG. 1 is a block diagram illustrating an example network system 8 having a data center 10 in which examples of the techniques described herein may be implemented. In general, data center 10 provides an operating environment for applications and services for customer sites 11 having one or more customer networks coupled to data center 10 by a service provider network 7. Data center 10 may, for example, host infrastructure equipment, such as networking and storage systems, redundant power supplies, and environmental controls. Service provider network 7 is coupled to a public network 4. Public network 4 may represent one or more networks administered by other providers and may thus form part of a large-scale public network infrastructure, e.g., the Internet. For instance, public network 4 may represent a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 4 are illustrated and described primarily as edge networks of service provider network 7, in some examples, one or more of customer sites 11 and public network 4 are tenant networks within data center 10 or another data center. For example, data center 10 may host multiple tenants (customers) each associated with one or more virtual private networks (VPNs). Each of the VPNs may implement one of customer sites 11.

Service provider network 7 offers packet-based connectivity to attached customer sites 11, data center 10, and public network 4. Service provider network 7 may represent a network that is operated (and potentially owned) by a service provider to interconnect a plurality of networks. Service provider network 7 may implement Multi-Protocol Label Switching (MPLS) forwarding and, in such instances, may be referred to as an MPLS network or MPLS backbone. In some instances, service provider network 7 represents a plurality of interconnected autonomous systems, such as the Internet, that offers services from one or more service providers.

In some examples, data center 10 may represent one of many geographically distributed network data centers. As illustrated in the example of FIG. 1, data center 10 may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10 such as one or more physical network functions (PNFs) or virtualized network functions (VNFs) may be included within the service provider network 7 core.

In this example, data center 10 includes storage and/or compute servers interconnected via switch fabric 14 provided by one or more tiers of physical network switches and routers, with servers 12A-12X (herein, "servers 12") depicted as coupled to top-of-rack (TOR) switches 16A-16N. This disclosure may refer to TOR switches 16A-16N collectively, as "TOR switches 16." TOR switches 16 may be network devices that provide layer 2 (MAC) and/or layer 3 (e.g., IP) routing and/or switching functionality.

Servers 12 may also be referred to herein as "hosts" or "host devices." Data center 10 may include many additional servers coupled to other TOR switches 16 of the data center 10.

Switch fabric 14 in the illustrated example includes interconnected TOR switches 16 (or other "leaf" switches) coupled to a distribution layer of chassis switches 18A-18M (collectively, "chassis switches 18"). Chassis switches may also be referred to as "spine" or "core" switches. Although not shown in the example of FIG. 1, data center 10 may also include one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, and/or other network devices.

In some examples, TOR switches 16 and chassis switches 18 provide servers 12 with redundant (e.g., multi-homed) connectivity to IP fabric 20 and service provider network 7. Chassis switches 18 aggregate traffic flows and provide connectivity between TOR switches 16. TOR switches 16 and chassis switches 18 may each include one or more processors and a memory and can execute one or more software processes. Chassis switches 18 are coupled to IP fabric 20, which may perform layer 3 routing to route network traffic between data center 10 and customer sites 11 via service provider network 7. The switching architecture of data center 10 shown in FIG. 1 is merely an example. Other switching architectures may have more or fewer switching layers, for instance. TOR switches 16 and chassis switches 18 may each include physical network interfaces.

In this disclosure, the terms "packet flow," "traffic flow," or simply "flow" each refer to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. The term "source port" refers to a transport layer (e.g., TCP/UDP) port. A "port" may refer to a physical network interface of a NIC.

Each of servers 12 may be a compute node, an application server, a storage server, or other type of server. For example, each of servers 12 may represent a computing device, such as an x86 processor-based server, configured to operate according to techniques described herein. Servers 12 may provide Network Function Virtualization Infrastructure (NFVI) for a Network Function Virtualization (NFV) architecture.

Servers 12 may host endpoints for one or more virtual networks that operate over the physical network represented in FIG. 1 by IP fabric 20 and switch fabric 14. Endpoints may include, e.g., virtual machines, containerized applications, or applications executing natively on the operating system or bare metal. Although described primarily with respect to a data center-based switching network, other physical networks, such as service provider network 7, may underlay the one or more virtual networks.

Each of servers 12 includes at least one network interface card (NIC) of NICs 13A-13X (collectively, "NICs 13"). For example, server 12A includes NIC 13A. Each of NICs 13 includes at least one port. Each of NICs 13 may send and receive packets over one or more communication links coupled to the ports of the NIC.

In some examples, each of NICs 13 provides one or more virtual hardware components for virtualized input/output (I/O). A virtual hardware component for virtualized I/O may be a virtualization of a physical NIC 13 (the "physical function"). For example, in Single Root I/O Virtualization (SR-IOV), which is described in the Peripheral Component Interface Special Interest Group SR-IOV specification, the Peripheral Component Interface (PCI) express (PCIe) Physical Function of the network interface card (or "network adapter") is virtualized to present one or more virtual network interface cards as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component. As another example, one or more servers 12 may implement Open vSwitch to perform distributed virtual multilayer switching between one or more virtual NICs (vNICs) for hosted virtual machines, where such vNICs may also represent a type of virtual hardware component. In some instances, the virtual hardware components are virtual I/O (e.g., NIC) components. In some instances, the virtual hardware components are SR-IOV virtual functions and may provide SR-IOV with Data Plane Development Kit (DPDK)-based direct process user space access.

In some examples, one or more of NICs 13 include multiple ports. NICs 13 may be connected to one another via ports of NICs 13 and communications links to form a NIC fabric having a NIC fabric topology. Such a NIC fabric is the collection of NICs 13 connected to at least one other of NICs 13 and the communications links coupling NICs 13 to one another.

NICs 13A-13X include corresponding processing units 25A-25X (collectively, "processing units 25"). Processing units 25 to offload aspects of the datapath from CPUs of servers 12. One or more of processing units 25 may be a multi-core ARM processor with hardware acceleration provided by a Data Processing Unit (DPU), a Field Programmable Gate Array (FPGA), and/or an Application Specific Integrated Circuit (ASIC). Because NICs 13 include processing units 25, NICs 13 may be referred to as "Smart-NICs" or "GeniusNICs."

In accordance with various aspects of the techniques of this disclosure, an edge services platform uses processing units 25 of NICs 13 to augment the processing and networking functionality of switch fabric 14 and/or servers 12 that include NICs 13. In the example of FIG. 1, network system 8 includes an edge services controller 28. This disclosure may also refer to an edge services controller, such as edge services controller 28, as an edge services platform controller.

Edge services controller 28 may manage the operations of the edge services platform within NIC 13s in part by orchestrating services performed by processing units 25; orchestrating API driven deployment of services on NICs 13; orchestrating NIC 13 addition, deletion and replacement within the edge services platform; monitoring of services and other resources on NICs 13; and/or management of connectivity between various services 133 running on the NICs 13. In some examples, edge services controller 28 may include one or more computing devices, such as server devices, personal computers, intermediate network devices, or the like, configured to execute a distributed implementation of an edge services controller. In some examples, edge services controller 28 may be implemented using a single computing device.

Edge services controller 28 may communicate information describing services available on NICs 13, a topology of a NIC fabric, or other information about the edge services platform to an orchestration system (not shown) or a controller 24. Edge services controller 28 may be integrated within an overall controller 24 for computing infrastructure 8. Example orchestration systems include OpenStack, vCenter by VMWARE, or System Center by MICROSOFT CORPORATION of Redmond, Washington. Example controllers include a controller for Contrail by JUNIPER NETWORKS or Tungsten Fabric. Controller 24 may be a network fabric manager. Additional information regarding a controller 24 operating in conjunction with other devices of data center 10 or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. Pat. No. 9,571,391, filed Mar. 26, 2014, and entitled "Tunneled Packet Aggregation for Virtual Networks," each of which is incorporated by reference as if fully set forth herein.

Edge services controller 28 may be configured to determine a respective server weight for each of a plurality of servers 12, based on a respective predicted resource utilization value for each of the plurality of servers 12; determine a respective application weight for each of a plurality of services, based on a respective predicted resource utilization value for each of the plurality of services; schedule a service of the plurality of services on a server of the plurality of servers 12 based on the respective server weight for the server and the respective application weight for the service.

In some embodiments, the edge services controller 28 may implement a self-learning scheduler that acquires knowledge about future resource requirements of services and resource availabilities of servers 12. The self-learning scheduler may use a machine learning model to make predictions of future resource requirements based on usage telemetry data relative to start times for each of the services. The self-learning scheduler may use the machine learning model to make predictions of future resource availabilities for servers 12 based on resource usage telemetry of service instances. Based on the predicted future resource requirements and predicted future resource availabilities, the self-learning scheduler can push a service having a high future resource requirement to a server having a high future resource availability. For example, a service requiring high resources, such as a first instance of first service 29, can be scheduled for deployment on NIC 13A of server 12A. Pursuant to this illustrative example, server 12A may have a greater amount of future resource availability as compared to at least one other server 12X.

Figure 2:
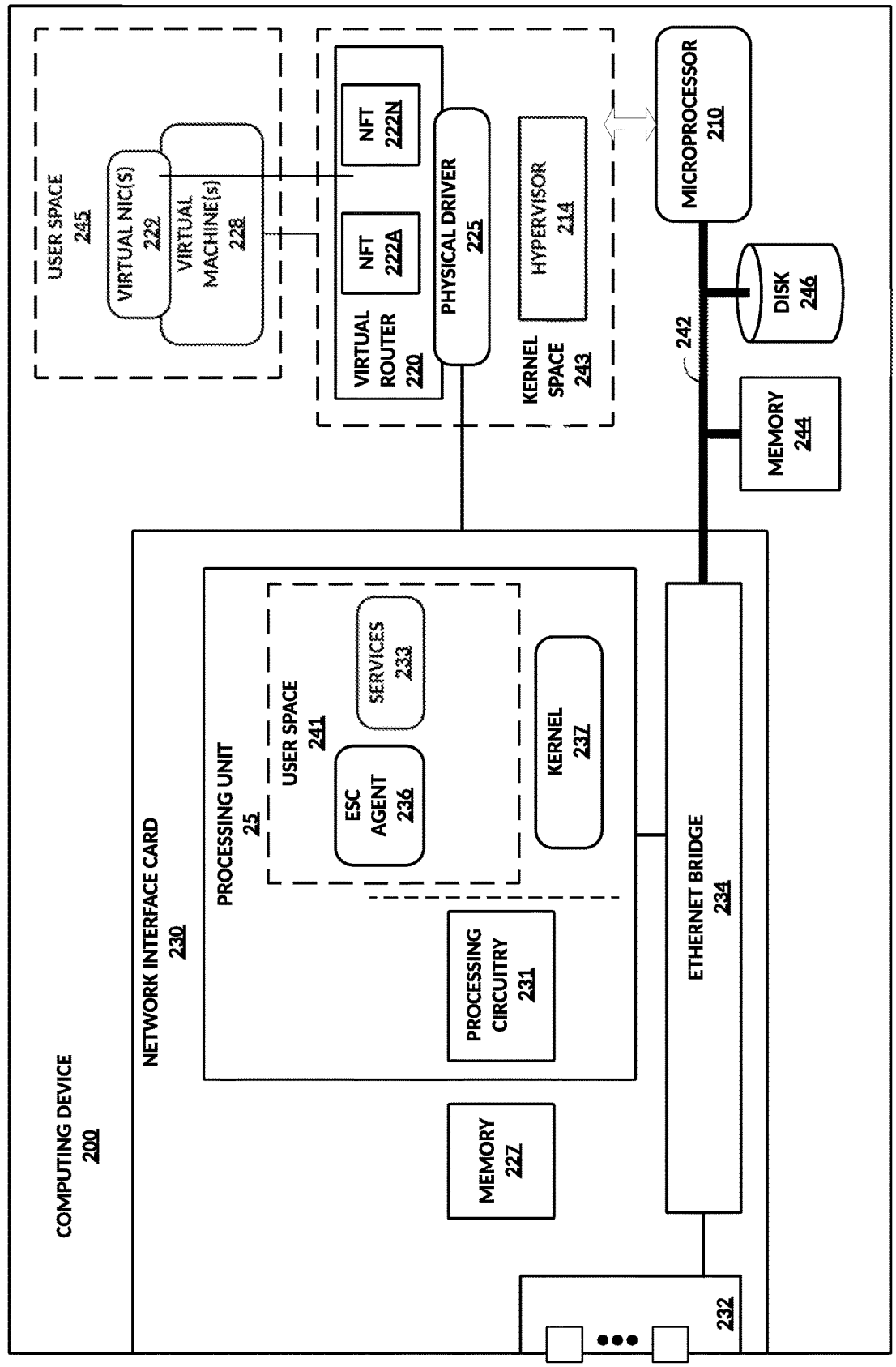
FIG. 2 is a block diagram illustrating an example computing device that uses a network interface card having a separate processing unit, to perform services managed by an edge services platform according to techniques described herein.

FIG. 2 is a block diagram illustrating an example computing device 200 that uses a NIC 230 having a separate processing unit 25, to perform services managed by an edge services platform according to techniques described herein. Computing device 200 of FIG. 2 may represent a real or virtual server and may represent an example instance of any of servers 12 of FIG. 1. In the example of FIG. 2, computing device 200 includes a bus 242 that couples hardware components of the hardware environment of computing device 200. Specifically, in the example of FIG. 2, bus 242 couples a Single Route Input/Output Virtualization (SR-IOV)-capable NIC 230, a storage disk 246, and a microprocessor 210. In some examples, a front-side bus couples microprocessor 210 and memory device 244. In some examples, bus 242 couples memory device 244, microprocessor 210, and NIC 230. Bus 242 may represent a PCIe bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit ("processing core") to perform instructions that conform to an instruction set architecture. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Memory device 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Memory device 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 also include an on-card memory 227 to, e.g., store packet data. Direct memory access transfers between NIC 230 and other devices coupled to bus 242 may read/write from/to the memory 227.

Memory device 244, NIC 230, disk 246, and microprocessor 210 provide an operating environment for a software stack that executes a hypervisor 214 and one or more virtual machines 228 managed by hypervisor 214. In general, a virtual machine provides a virtualized/guest operating system for executing applications in an isolated virtual environment. Because a virtual machine is virtualized from physical hardware of the host server, executing applications are isolated from both the hardware of the host and other virtual machines. Computing device 200 executes hypervisor 214 to manage virtual machines 228. Example hypervisors include Kernel-based Virtual Machine (KVM) for the Linux kernel, Xen, ESXi available from VMWARE, Windows Hyper-V available from MICROSOFT, and other open-source and proprietary hypervisors. Hypervisor 214 may represent a virtual machine manager (VMM). Virtual machines 228 may host one or more applications, such as virtual network function instances. In some examples, a virtual machine 228 may host one or more VNF instances, where each of the VNF instances is configured to apply a network function to packets.

An alternative to virtual machines is the virtualized container, such as those provided by the open-source DOCKER Container application. Like a virtual machine, each container is virtualized and may remain isolated from the host machine and other containers. However, unlike a virtual machine, each container may omit an individual operating system and provide only an application suite and application-specific libraries. A container is executed by the host machine as an isolated user-space instance and may share an operating system and common libraries with other containers executing on the host machine. Thus, containers may require less processing power, storage, and network resources than virtual machines. As used herein, containers may also be referred to as virtualization engines, virtual private servers, silos, or jails. In some instances, the techniques described herein with respect to containers and virtual machines or other virtualization components.

While virtual network endpoints in FIG. 2 are illustrated and described with respect to virtual machines, other operating environments, such as containers (e.g., a DOCKER container) may implement virtual network endpoints. An operating system kernel (not shown in FIG. 2) may execute in kernel space and may include, for example, a Linux, Berkeley Software Distribution (BSD), another Unix-variant kernel, or a Windows server operating system kernel, available from MICROSOFT.

Hypervisor 214 includes a physical driver 225 to use a physical function provided by NIC 230. In some cases, NIC 230 may also implement SR-IOV to enable sharing the physical network function (I/O) among virtual machines 224. Each port of NIC 230 may be associated with a different physical function. The shared virtual devices, also known as virtual functions, provide dedicated resources such that each of virtual machines 228 (and corresponding guest operating systems) may access dedicated resources of NIC 230, which therefore appears to each of virtual machines 224 as a dedicated NIC. Virtual functions may be lightweight PCIe functions that share physical resources with the physical function and with other virtual functions. NIC 230 may have thousands of available virtual functions according to the SR-IOV standard, but for I/O-intensive applications the number of configured virtual functions is typically much smaller.

Virtual machines 228 include respective virtual NICs 229 presented directly into the virtual machine 228 guest operating system, thereby offering direct communication between NIC 230 and virtual machines 228 via bus 242, using the virtual function assigned for the virtual machine. This may reduce hypervisor 214 overhead involved with software-based, VIRTIO and/or vSwitch implementations in which a memory address space of hypervisor 214 within memory device 244 stores packet data and because copying packet data from NIC 230 to the memory address space of hypervisor 214 and from the memory address space of hypervisor 214 to memory address spaces of virtual machines 228 consumes cycles of microprocessor 210. Microprocessor 210 is a server resource and may be associated with a CPU utilization percentage. The CPU utilization percentage may be incorporated into the machine learning model.

NIC 230 may be associated with a network utilization for bandwidth to/from the ports of NIC 239. The network utilization for bandwidth is a server resource and can be incorporated into the machine learning model. NIC 230 may further include a hardware-based Ethernet bridge 234. Ethernet bridge 234 may be an example of an embedded switch 234. Ethernet bridge 234 may perform layer 2 forwarding between virtual functions and physical functions of NIC 230. Thus, in some cases, Ethernet bridge 234 provides hardware acceleration, via bus 242, of inter-virtual machine 224 packet forwarding and hardware acceleration of packet forwarding between hypervisor 214 and any of virtual machines 224. Hypervisor 214 may access the physical function via physical driver 225. Ethernet bridge 234 may be physically separate from processing unit 25. Processing unit 25 is a server resource and may be associated with a data processing unit (DPU) utilization percentage. The DPU utilization percentage can be incorporated into the machine learning model.

Computing device 200 may be coupled to a physical network switch fabric that includes an overlay network that extends a switch fabric from physical switches to software or "virtual" routers of physical servers coupled to the switch fabric, including virtual router 220. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. At least some functions of the virtual router may be performed as one of services 233 or fabric service 235. In the example of FIG. 2, virtual router 220 executes within hypervisor 214 that uses physical function 221 for I/O, but virtual router 220 may execute within a hypervisor, a host operating system, a host application, one of virtual machines 228, and/or processing unit 25 of NIC 230.

In general, each virtual machine 228 may be assigned a virtual address for use within a corresponding virtual network, where each of the virtual networks may be associated with a different virtual subnet provided by virtual router 220. A virtual machine 228 may be assigned its own virtual layer three (L3) IP address, for example, for sending and receiving communications but may be unaware of an IP address of the computing device 200 on which the virtual machine is executing. In this way, a "virtual address" is an address for an application that differs from the logical address for the underlying, physical computer system, e.g., computing device 200.

In one implementation, computing device 200 includes a virtual network (VN) agent (not shown) that controls the overlay of virtual networks for computing device 200 and that coordinates the routing of data packets within computing device 200. In general, a VN agent communicates with a virtual network controller for the multiple virtual networks, which generates commands to control routing of packets. A VN agent may operate as a proxy for control plane messages between virtual machines 228 and virtual network controller, such as controller 24 (FIG. 1). For example, a virtual machine may request to send a message using its virtual address via the VN agent, and VN agent may in turn send the message and request that a response to the message be received for the virtual address of the virtual machine that originated the first message. In some cases, a virtual machine 228 may invoke a procedure or function call presented by an application programming interface of VN agent, and the VN agent may handle encapsulation of the message as well, including addressing.

In one example, network packets, e.g., layer three (L3) IP packets or layer two (L2) Ethernet packets generated or consumed by the instances of applications executed by virtual machine 228 within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 220. This functionality is referred to herein as tunneling and may be used to create one or more overlay networks. Besides IPinIP, other example tunneling protocols that may be used include IP over Generic Route Encapsulation (GRE), Virtual Extensible Local Area Network (VXLAN), Multiprotocol Label Switching (MPLS) over GRE (MPLSoGRE), MPLS over User Datagram Protocol (UDP) (MPLSoUDP), etc.

As noted above, a virtual network controller may provide a logically centralized controller for facilitating operation of one or more virtual networks. The virtual network controller may, for example, maintain a routing information base, e.g., one or more routing tables that store routing information for the physical network as well as one or more overlay networks. Virtual router 220 of hypervisor 214 implements a network forwarding table (NFT) 222A-222N for N virtual networks for which virtual router 220 operates as a tunnel endpoint. In general, each NFT 222 stores forwarding information for the corresponding virtual network and identifies where data packets are to be forwarded and whether the packets are to be encapsulated in a tunneling protocol, such as with a tunnel header that may include one or more headers for different layers of the virtual network protocol stack. Each of NFTs 222 may be an NFT for a different routing instance (not shown) implemented by virtual router 220.

In accordance with techniques of this disclosure, edge services controller 28 (FIG. 1) uses processing unit 25 of NIC 230 to augment the processing and networking functionality of computing device 200. Processing unit 25 includes processing circuitry 231 to execute services orchestrated by edge services controller 28. Processing circuitry 231 may represent any combination of processing cores, ASICs, FPGAs, or other integrated circuits and programmable hardware. In an example, processing circuitry may include a System-on-Chip (SoC) having, e.g., one or more cores, a network interface for high-speed packet processing, one or more acceleration engines for specialized functions (e.g., security/cryptography, machine learning, storage), programmable logic, integrated circuits, and so forth. Such SoCs may be referred to as data processing units (DPUs). DPUs may be examples of processing unit 25.

In the example NIC 230, processing unit 25 executes an operating system kernel 237 and a user space 241 for services. Kernel 237 may be a Linux kernel, a Unix or BSD kernel, a real-time OS kernel, or other kernel for managing hardware resources of processing unit 25 and managing user space 241.

Services 233 may include network, security, storage, data processing, co-processing, machine learning or other services. Services 233 and edge services platform (ESP) agent 236 include executable instructions. Processing unit 25 may execute instructions of services 233 and edge services controller (ESC) agent 236 as processes and/or within virtual execution elements such as containers or virtual machines. As described elsewhere in this disclosure, services 233 may augment the processing power of the host processors (e.g., microprocessor 210), e.g., by enabling computing device 200 to offload packet processing, security, or other operations that would otherwise be executed by the host processors. Network services of services 233 may include security services (e.g., firewall), policy enforcement, proxy, load balancing, or other L4-L7 services.

Processing unit 25 executes ESC agent 236 to exchange data with edge services controller 28 (FIG. 1) for the edge services platform. While shown in the example of FIG. 2 as being in user space 241, in other examples, ESC agent 236 is a kernel module of kernel 237. As an example, ESC agent 236 may collect and send telemetry data to the edge services controller 28 (FIG. 1). The telemetry data may be generated by services 233 (FIG. 2) and may describe traffic in the network, availability of computing device 200 or network resources, resource availability of resources of processing unit 25 (such as memory or core utilization), or other information. As another example, ESC agent 236 may receive, from the edge services controller, service code to execute any of services 233, service configuration to configure any of services 233, packets or other data for injection into the network.

Edge services controller 28 (FIG. 1) manages the operations of processing unit 25 by, e.g., orchestrating and configuring services 233 (FIG. 2) that are executed by processing unit 25, deploying services 233; adding, deleting and replacing NICs within the edge services platform, monitoring of services 233 and other resources on NIC 230, and managing connectivity between various services 233 running on NIC 230. The edge services controller 28 may push one or more services 233 to NICs of one or more servers, based on based on predicted future application/service resource utilizations and server resource utilizations.

Example resources on NIC 230 include memory 227 and processing circuitry 231. Edge services controller 28 may provide topology information via ESC agent 236. Edge services controller 28 may provide flow information and/or forwarding information via ESC agent 236. The flow information describes, and is usable for identifying, packet flows. The forwarding information is usable for mapping packets received by NIC 230 to an output port of NIC 230.

Figure 3:
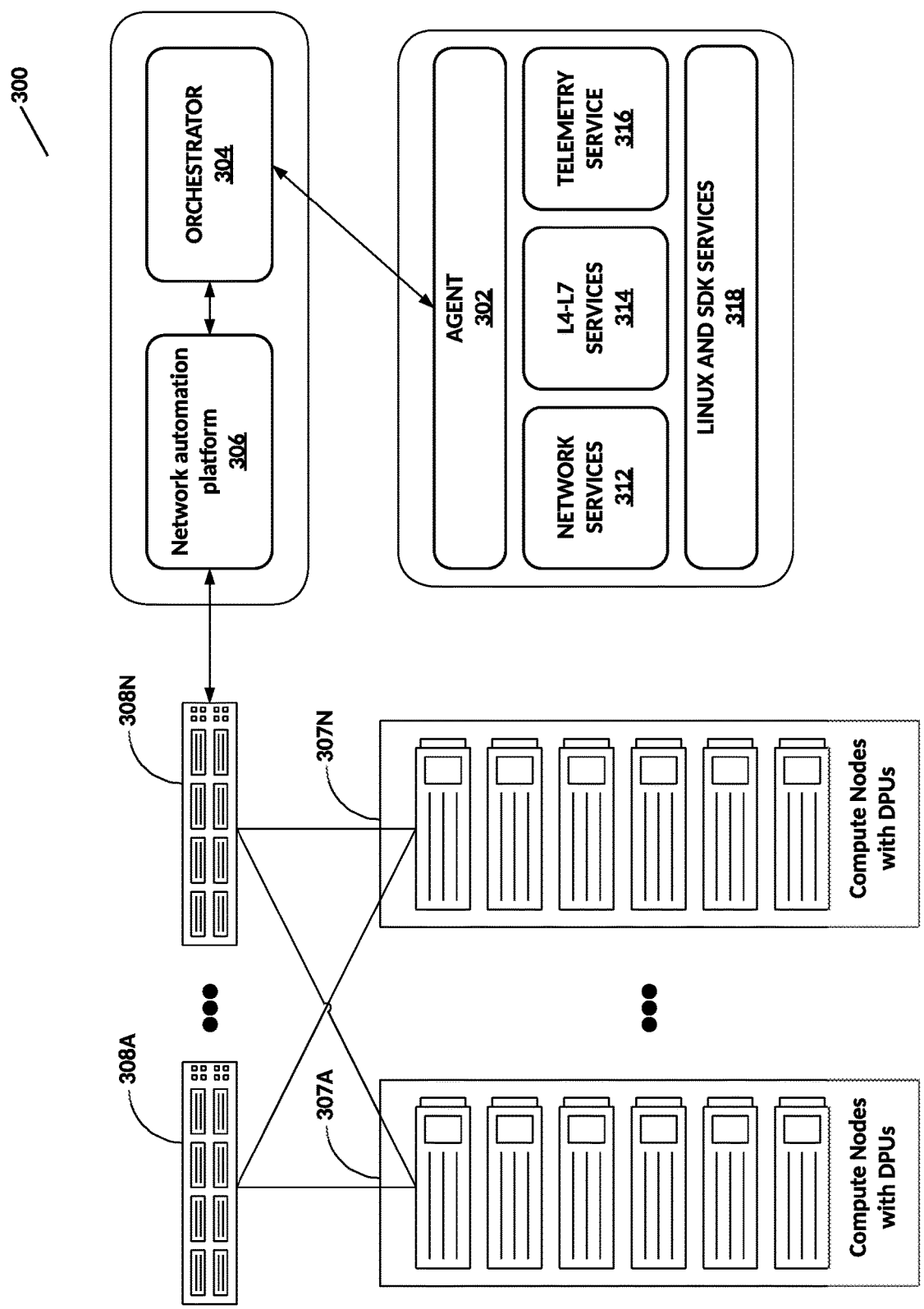
FIG. 3 is a conceptual diagram illustrating a data center with servers that each include a network interface card having a separate processing unit, controlled by an edge services platform, according to techniques of this disclosure.

FIG. 3 is a conceptual diagram illustrating a data center 300 with servers that each include a network interface card having a separate processing unit, controlled by an edge services platform, according to techniques of this disclosure. Racks of compute nodes 307A-307N (collectively, "racks of compute nodes 307") may correspond to servers 12 of FIG. 1, and switches 308A-308N (collectively, "switches 308") may correspond to the switches of switch fabric 14 of FIG. 1. An agent 302 of orchestrator 304 represents software executed by the processing unit (illustrated in FIG. 3 as a data processing unit or DPU) and receives configuration information for the processing unit and sends telemetry and other information for the NIC that includes the processing unit to orchestrator 304. Agent 302 may represent an example of ESC agent 236. Network services 312, L4-L7 services 314, telemetry service 316, and Linux and software development kit (SDK) services 318 may represent examples of services 233. Orchestrator 304 may represent an example of edge services controller 28 of FIG. 1.

Network automation platform 306 connects to and manages network devices and orchestrator 304, by which network automation platform 306 can utilize the edge services platform. Network automation platform 306 may, for example, deploy network device configurations, manage the network, extract telemetry, and analyze and provide indications of the network status.

Figure 4:
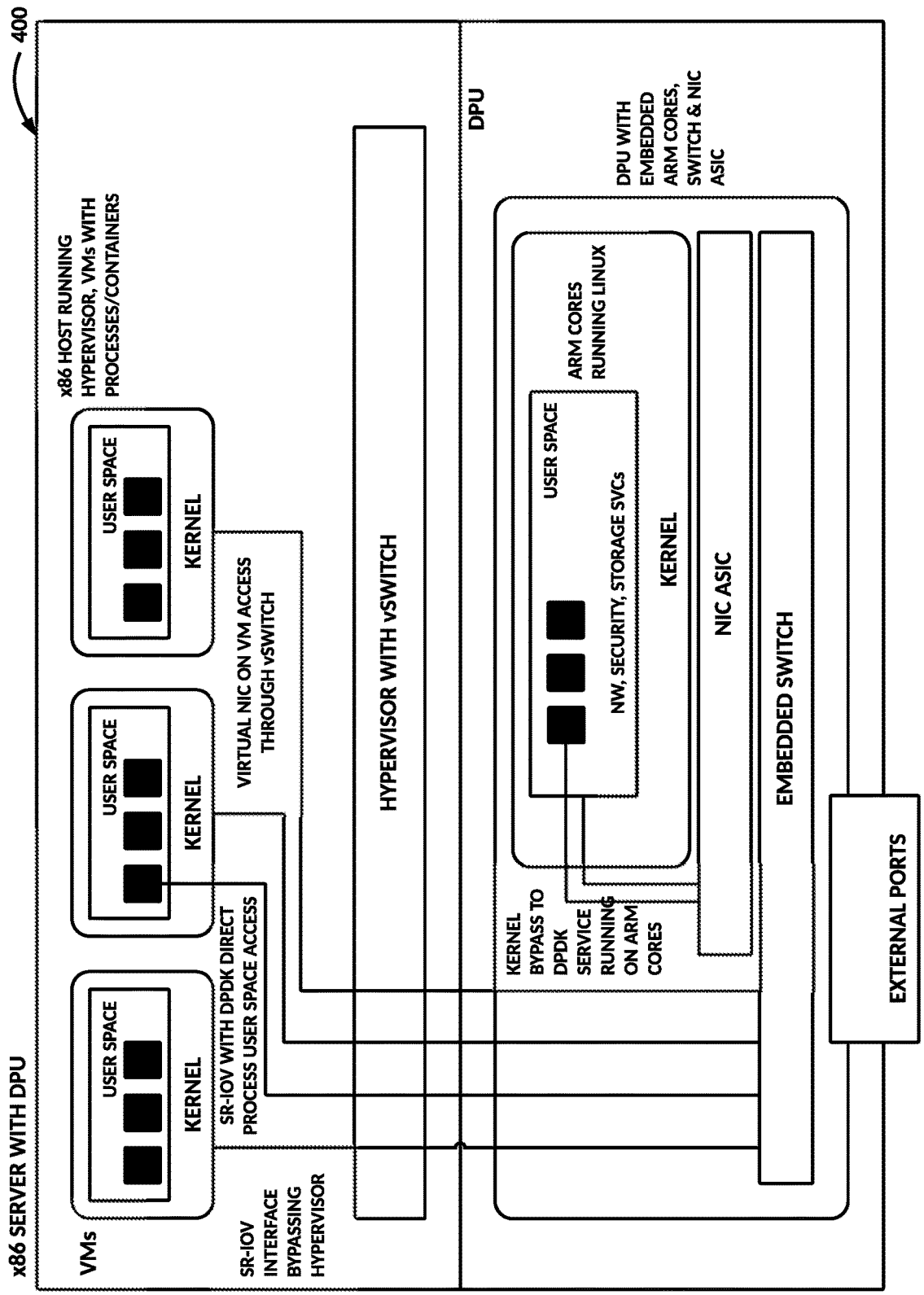
FIG. 4 is a block diagram illustrating an example computing device that uses a network interface card having a separate processing unit, to perform services managed by an edge services platform according to techniques described herein.

FIG. 4 is a block diagram illustrating an example computing device that uses a network interface card having a separate processing unit, to perform services managed by an edge services platform according to techniques described herein. Although virtual machines are shown in this example, other instances of computing device 400 may also or alternatively run containers, native processes, or other endpoints for packet flows. Different types of vSwitches may be used, such as Open vSwitch or a virtual router (e.g., Contrail). Other types of interfaces between endpoints and NIC are also contemplated, such as tap interfaces, veth pair interfaces, etc.

Figure 5:
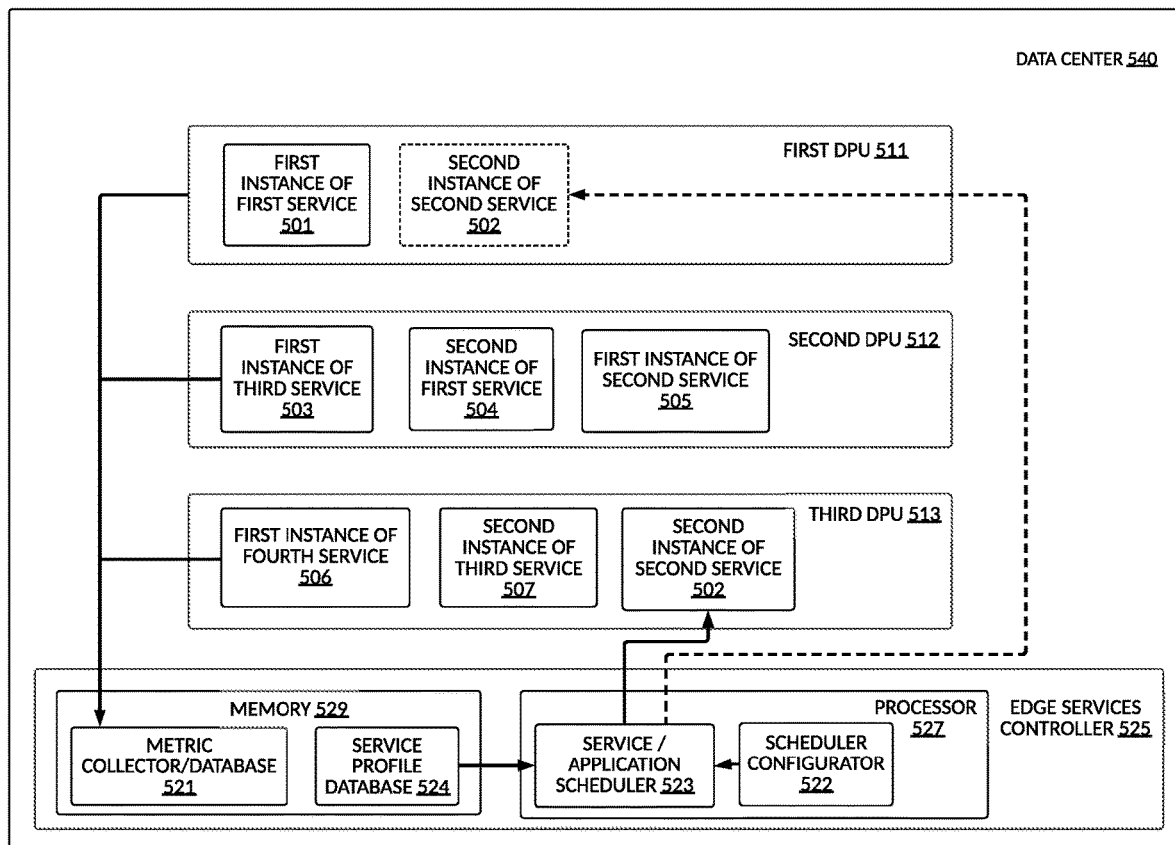
FIG. 5 a block diagram illustrating an example system for scheduling one or more services to one or more servers, according to techniques of this disclosure.

FIG. 5 is a block diagram illustrating an example data center 540 having an edge services controller 525 for scheduling one or more services to one or more servers, according to techniques of this disclosure. Edge services controller 525 may represent an example instance of edge services controller 28 of FIG. 1. In the illustrated example, single or multiple instances of services may be running on DPUs of any of three servers, which are represented by and include a corresponding first DPU 511, a second DPU 512, and a third DPU 513. For example, a first instance of a first service 501 and a second instance of a second service 502 may be running on the first DPU 511. Likewise, a first instance of a third service 503, a second instance of the first service 504, and a first instance of the second service 505 may be running on the second DPU 512. Similarly, a first instance of a fourth service 506 and a second instance of the third service 507 may be running on the third DPU 513. One or more processors ("processor 527") of edge services controller 525 may be configured to implement a service/application scheduler 523 for scheduling one or more services on at least one of the first, second, or third DPUs 511, 512 and 513. The edge services platform controller 525 may also include a scheduler configurator 522 that receives and tracks any server taints and/or affinity configurations. Server taints can be used to mark a server that is in an unusable, unstable, or security-compromised state, so that the application scheduler 523 can avoid scheduling a service to the marked server. Affinity configuration, which may also be referred to as DPU pinning or "cache affinity", enables a binding of a service, process or thread to a specific DPU, so that the service, process or thread will execute only on the designated DPU rather than on any DPU. Processor 527 can be operatively coupled to a memory 529 configured for storing a service profile database 524 and a metric collector database 521. The service profile database 524 associates each of a plurality of services/applications with a corresponding resource utilization level.

Consider an illustrative scenario where a resource utilization of the first service is high, and the utilization reaches a peak in a periodic and/or predictable pattern. When the peak is reached, the first service may consume almost all available resources, and/or may compete with other services running on the same DPU, such as the first DPU 511. These factors may cause performance issues with respect to the first service, and/or any other service running on the first DPU 511, due to insufficient resources on the first DPU 511. For example, assume that the service/application scheduler 523 is configured for scheduling the second instance of the second service 502 using a traditional scheduling approach based on current resource availability. As the first instance of the second service 505 is already running on the second DPU 512, the service/application scheduler 523 is able to select from among the first DPU 511 and the third DPU 513 as target servers for scheduling. The service/application scheduler 523 may obtain resource availability information for the first DPU 511 and the third DPU 513 from the metric collector/database 521. The service/application scheduler 523 may also check a requirements profile for the second service from the service profile database 524 to see if the first DPU 511 and/or the third DPU 513 have required and/or sufficient resources to run the second service.

Pursuant to a traditional scheduling approach, the service/application scheduler 523 lacks knowledge of resource utilization patterns for services and servers. For example, the service/application scheduler 523 may determine that the first DPU 511 and the third DPU 513 both have sufficient resources for running the second service, but the first DPU 511 has more resources than the third DPU 513. Thus, the service/application scheduler 523 may simply schedule the second instance of the second service onto the first DPU 511, in response to the first DPU 511 having more available resources than the third DPU 513. However, if the first DPU 511 is selected for running the first service, a relatively large amount of resources may be consumed on a periodic basis, causing other services to starve for resources. Such a scheduling approach can cause performance issues for the first instance of the first service 501 and the second instance of the second service 502, which are both running on the first DPU 511. In the present example, the second service 502 running on the first DPU 511 is shown in dashed lines to indicate that this scheduling may be suboptimal and/or inefficient.

Performance issues may arise when resource utilization of the first instance of the first service 501 reaches a peak value as per its resource utilization pattern. For example, if the second instance of the second service 502 is deployed to the first DPU 511, the second instance of the second service 502 may be forced to compute for resources of the first DPU 511 with the first instance of first service 501 and may be unable to obtain sufficient resources of the first DPU 511 to operate effectively This scenario represents an existing or traditional approach to scheduling.

The edge services controller 525 may acquire knowledge associated with future resource requirements of services and future resource availabilities of servers, such as the first, second, and third DPUs 511, 512 and 513. Based on this acquired knowledge, the service/application scheduler 523 may schedule the second instance of second service 502 to the third DPU 513 instead of the first DPU 511. For example, the second instance of second service 502 can be scheduled to the third DPU 513 where resource consumption of already running services may not be high, such that the third DPU 513 is predicted to have sufficient future resources to accommodate the second instance of second service 502.

Figure 6:
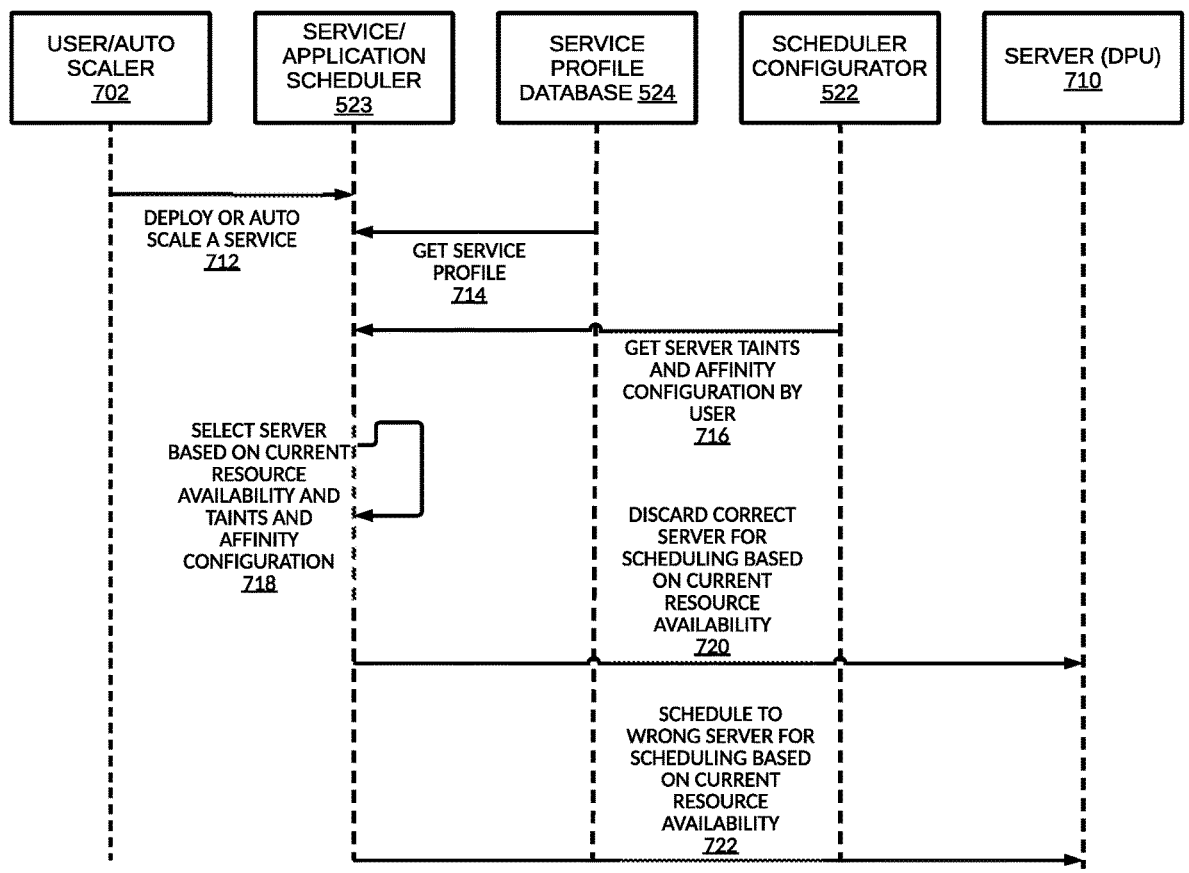
FIG. 6 is a data flow diagram illustrating an example method for scheduling one or more services to one or more servers, according to techniques of this disclosure.

FIG. 6 is a data flow diagram illustrating an example method for scheduling one or more services. The procedure may commence at step 712 where a user/auto scaler 702 sends a request to the service/application scheduler 523 requesting a deployment and/or an auto-scaling of a service. At step 714, the service/application scheduler 523 may obtain a service profile from the service profile database 524. The service profile associates a specified service/application with a corresponding resource utilization level.

The service/application scheduler 523 may obtain server taints and/or an affinity configuration by user from the scheduler configurator 522 at step 716. As mentioned previously, the server taint can be used to mark a server that is in an unusable, unstable, or security-compromised state, so that the application scheduler 523 can avoid scheduling a service to the marked server. Affinity configuration enables a binding of a service, process or thread to a specific DPU, so that the service, process or thread will execute only on the designated DPU rather than on any DPU. The service/application scheduler 523 may then select a server based on current resource availability, the server taints, and/or the affinity configuration at step 718. At step 720, pursuant to a traditional or conventional approach, the service/application scheduler 523 may discard a correct or optimum server for scheduling while selecting a server (i.e., a DPU such as the first, second, or third DPUs 511, 512, 513 of FIG. 5) based solely on current resource availability. Accordingly, at step 722 (FIG. 7), the service/application scheduler 523 schedules the service to a wrong (i.e., a less optimal or less efficient) server due to the scheduling being based solely on current resource availability.

Figure 7:
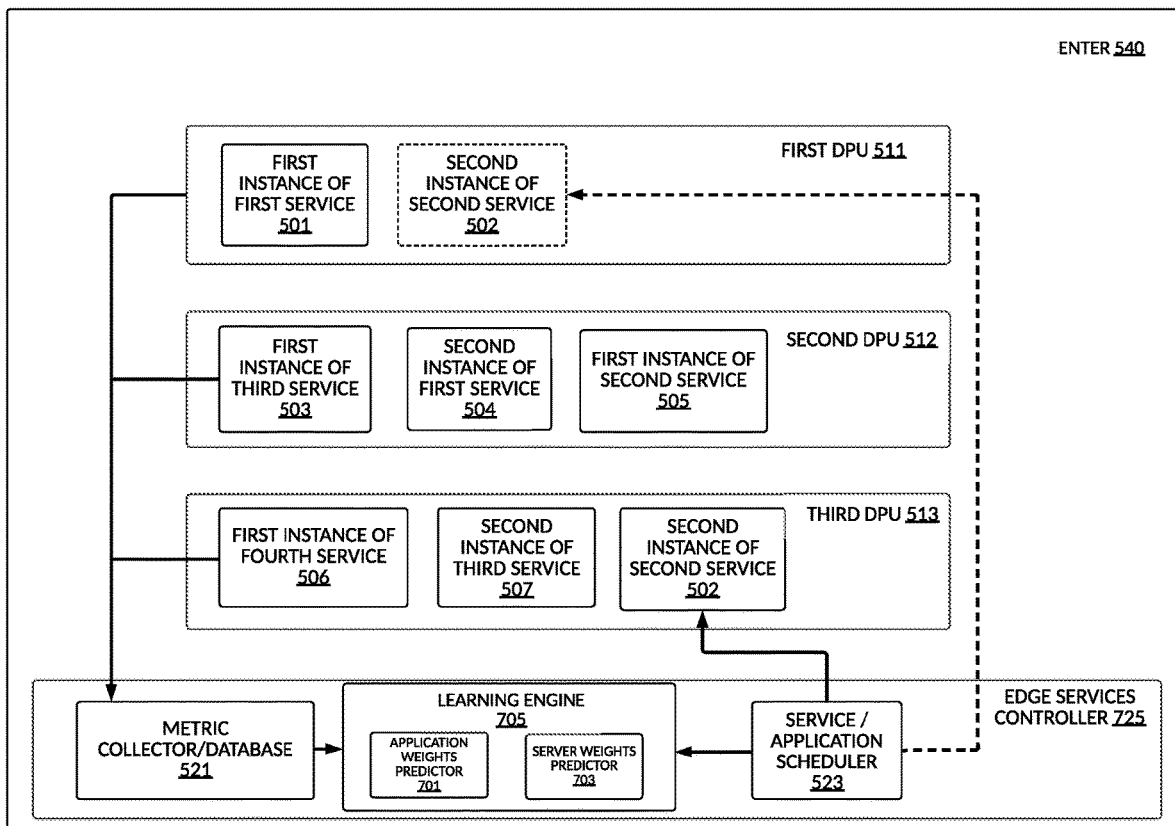
FIG. 7 is a block diagram illustrating an example system for scheduling one or more services to one or more servers, according to techniques of this disclosure.

FIG. 7 is a block diagram illustrating an example system for scheduling one or more services to one or more servers, according to techniques of this disclosure. An edge services controller 725 implements a self-learning scheduler. The self-learning scheduler may use a learning engine 705 to learn about resource utilization requirements of services, and resource utilization patterns of servers, to schedule services to appropriate servers to further optimize service scheduling. By analyzing historical usage data of servers and services/applications obtained from the metric collector/database 521, the learning engine 705 can train a machine learning model to predict resource utilization values for servers and services/applications at any given timestamp.

Based on the predicted resource utilization patterns for each of a plurality of servers, a server weights predictor 703 of the learning engine 705 may calculate a server weight for each of the plurality of servers to thereby provide a set of server weights (Sw). Each respective server weight in the set of server weights (Sw) can be indicative of a resource availability on a corresponding server for scheduling. In one embodiment, high values of Sw for a given server indicate that more resources are available on the server, whereas low values of Sw indicate that less resources are available on the server. Based on the predicted resource utilization values of services/applications, an application weights predictor 701 of the learning engine 705 may calculate an application weight for each of one or more services/applications, to thereby provide a set of application weights (Aw). The set of application weights (Aw) may indicate the resource utilization requirements of the one or more services/applications. In one embodiment, high values of Aw indicate that the service requires more resources on the server, whereas low values of Aw indicate that the service requires less resources on the server. The learning engine 705 may instruct the service/application scheduler 523 to schedule a service based on the calculated set of server weights (Sw) and the calculated set of application weights (Aw). In one embodiment, a service with a high Aw is scheduled to a server with a high Sw. Accordingly, a service requiring high resources can be scheduled to a server having more resources.

Pursuant to an illustrative example, assume that a backup service is to be scheduled by a user every two hours throughout a 24-hour day. The resource utilization of the backup service may reach a peak every two hours. The machine learning model of the learning engine 705 analyzes the resource utilization metrics of the backup service as received from the metric collector/database 521, as well as the resource utilization metrics of the servers on which the backup service runs, to predict one or more timestamps at which the backup service would consume a peak and/or maximum amount of resources, thereby causing servers to have less resources available for other co-located services.

Resource usage metrics of individual services and servers can be exported from the metric collector/database 521 as a time series database (e.g., Prometheus). The collected resource usage metric data can be used to train the machine learning model of the learning engine 705 to predict the resource usage metrics at future timestamps. The trained machine learning model can be deployed to formulate a solution using the learning engine 705. The learning engine 705 can continue to analyze live resource usage data from the metric collector/database 521 and train the already-trained machine learning model to improve overall accuracy of the predictions.

The service/application scheduler 523, informed by one or more predictions from learning engine 705, may schedule the second instance of the second service 502 to the third DPU 513 rather than the first DPU 511. This is because the learning engine 705 possesses knowledge encompassing future resource requirements of services as well as resource availabilities of servers. Thus, the learning engine 705 can schedule the second instance of S2 onto the third DPU 513 where resource consumption of already running services not going to be high and the server (third DPU 513) has the required resources to accommodate the second instance of the second service 502, without causing any performance issues.

Some implementations described herein use learning engine 705 to generate a machine-learning based solution configured to predict future requirements of services, and also configured to predict future resource availabilities of servers. For example, some implementations described herein may train a model using a machine learning technique. The model may be trained based on observed operational information (e.g., telemetry data and/or the like) for a set of DPUs 511, 512, 513 and based on flow information for traffic flows processed by the set of DPUs while running specific applications and/or services. The model may output predicted performance information for the set of DPUs 511, 512 513 based on input information identifying traffic flows and/or operational information.

Furthermore, according to some implementations described herein, the learning engine 705 may update the model using the machine learning techniques and based on observations regarding efficacy of any of the set of DPUs 511, 512, 513 executing services and/or applications. In this way, the model may adapt to changing DPU conditions and topology (e.g., in real time as the network conditions and/or the topology change). Thus, throughput, reliability, and conformance with SLAs is improved. Further, some implementations described herein may use a rigorous, well-defined approach to service/application scheduling, which may reduce uncertainty, subjectivity, and inefficiency that may be introduced by a human actor attempting to define a scheduling policy based on empirical observations regarding network and DPU performance.

Also, some implementations described herein may identify a best or optimum DPU for executing an application/service at a given timestamp. Since the best or optimum DPU may iteratively change based on DPU load and DPU behavior/faults, the machine learning component of implementations described herein may regularly re-predict the best or optimum DPU to optimize application/service execution at any given time. This reprogramming may be based on dynamic prediction of DPU load, DPU dropouts, and/or DPU delays. Thus, implementations described herein may improve adaptability and versatility of DPU scheduling for applications/services in comparison to a rigidly defined scheduling protocol.

Furthermore, by using machine learning, implementations described herein may predict DPU delays or dropouts, or reduced capacity on network devices, and may perform pre-emptive scheduling updates to avoid inefficiencies or dropouts due to DPU degradation. Thus, forward-looking maintenance and scheduling is provided, which further improves reliability and performance.

The model trained by learning engine 705 and used for inference/prediction, as described in this disclosure, may be a machine learning (ML) model. Learning engine 705 may be able to train various types of ML models. For instance, in some examples, learning engine 705 is configured to train baseline ML models. A baseline ML model may be a type of ML model other than a deep learning ML models and statistical ML models. Baseline ML models may be able to generate predictions based on limited amounts of data. For example, a baseline ML model may be able to generate a prediction based on less than 1 hour of data (e.g., for hourly predictions). Example types of baseline ML models may include an Exponential Weighted Moving Average (EWMA) model, a Hidden Markov model, and so on.

In some examples, learning engine 705 is configured to train statistical ML models. Example types of statistical models include a Holt-Winters model, an autoregressive integrated moving average (ARIMA) model, a seasonal ARIMA model, a vector autoregression (VAR) model, a Facebook PROPHET model, and so on. In some examples, statistical ML models may have greater utility than basic ML models when there is more data available to use to make predictions. For instance, a statistical ML model that is used to generate hourly predictions may be usable when more than 24 hours of data is available.

In some examples, learning engine 705 is configured to train deep learning ML models. Deep learning ML models may require more data than basic ML models or statistical ML models but may be able to provide more sophisticated types of predictions. Example types of deep learning ML models may include Long Short-Term Memory (LSTM) models, bi-directional LSTM models, recurrent neural networks, or other types of neural networks that include multiple layers. In other examples, learning engine 705 may use neural network models other than deep learning ML models The ML models may be grouped as regression-based ML models, classification-based ML models, and unsupervised learning models. There may be baseline, statistical, and deep learning MLs for each of these groups. In some examples, for regression-based ML models, learning engine 705 may use a Hodrick-Prescott filter to perform an initial level of ML model selection. Specifically, the Hodrick-Prescott filter breaks time-series data (y_t) into a trend component and a cyclical component c_t: y_t=tou_t(trend)+c_t(cyclical). The time-series data is the data that the ML models use to generate the predictions. By breaking the time-series data into a trend component and a cyclical component, learning engine 705 may be able to determine whether the time-series data has more of a cyclic nature or more of a trend nature and use an appropriate ML model based on the determination. For example, the EWMA model and Holts-Winter model perform better on time-series data that has a cyclic nature. An ARIMA model, a VAR model, etc., may perform better on time-series data that has a trend nature.

By performing this initial level of ML model selection, learning engine 705 may be able to avoid training every regression-based ML model, thereby potentially saving time and computational resources. In some examples, learning engine 705 may filter the regression-based ML models based on how much data is available. For instance, if there is less than a threshold amount of time's worth of available training data (e.g., 24-48 hours), learning engine 705 may train only regression-based baseline ML models. Otherwise, if there is more than the threshold amount of time's worth of available data, learning engine 705 may additionally or alternatively train other types of regression-based ML models, such as statistical models or low capacity deep learning ML models.

Example types of regression-based baseline ML models may include a hidden Markov model and season trend decomposition approaches. Example types of regression-based statistical ML models may include Error-Trend-Seasonality (ETS) models (including exponential smoothing models, trend method models, and ETS decomposition), EWMA models (including simple moving averages and EWMA), Holt Winters models, ARIMA models, SARIMA models, vector autoregression models, seasonal trend autoregression (STAR) models, and Facebook PROPHET models. Example types of regression-based deep learning ML models may include LSTM architectures (including single-layer LSTMs, depth LSTMs, bi-directional LSTMs), RNNs, and gated recurrent units (GRUs). Example types of classification-based baseline ML models may include logistic regression models and K-nearest neighbor models. Example types of classification-based statistical ML models may include support vector machines and boosting ensemble algorithms (e.g. XGBoost). Example types of classification-based deep learning ML models may include LSTM architectures, RNN architectures, GRU architectures, and artificial neural network architectures. Example types of unsupervised ML models may include K-means clustering models, Gaussian clustering models, and density-based spatial clustering.

Prediction of the Set of Application Weights (Aw): The application weight can be an attribute of every service scheduled to run on any of the servers. It may be an indicator of resource usage requirements of a service at any given timestamp. When a service instance is going to consume more resources at a next hour, a next minute, or a next second, a higher value can be assigned to the application weight (Aw) compared to other less resource consuming services. Thus, when a service instance has a higher application weight (Aw) value, this may be indicative that the service instance would need more resources at the given timestamp. The application weight (Aw) can be predicted by the trained machine learning model using resource usage telemetry data of a service relative to a starting time of the service/application, as received from the metric collector/database 521. The machine learning model can predict the resource usage values for the given timestamp, and the set of application weights is calculated based on predicted resource usage metric values including one or more of: CPU Usage, Network Usage, DPU Usage, or another metric. In some embodiments, any one or more of the following resource usage telemetry metrics can be used to predict the set of application weights (Aw):
1) CPU Usage;
2) Memory Usage; and/or
3) Network Usage.

The historical data values of any of these metrics can be used to predict the metric values at different future timestamp values. Using the historical data of above metrics, a machine learning model is trained to predict metric values at future timestamps. In some examples, the machine learning model is implemented using Vector Auto Regression.

An example mathematical model for a metric value predictor machine learning model is:

$$MV(t)=a+W1*MV(t-1)+ \ldots +Wp*MV(t-p)+e(t)$$

where:
MV is Metric Value at future time t
a is constant
W1 & Wp are co-efficient values
p is number of past values of metric
e(t) is error correction at time t Table 1 shows a historical or past data of collected metrics and forecasted values at different future timestamps.

and 40% DPU usage may contribute 0.2 to the application weight.

Application Weight for Metric (AWmx) (Metric Value*Metric Weight Factor)/100, where Metric Value is predicted value of a metric, Metric Weight Factor is user adjusted or configured fraction between 0 and 1. One may take a mean of the predicted weights as a weight of the server:

$$\text{Application Weight}(Aw)=(\Sigma^n AWmx1+AWmx2+ \ldots AWmxi)$$

Prediction of the set of Server Weights (Sw): The set of server weights (Sw) may comprise an attribute of every server managed by the ESP Controller 725 and/or an orchestrator. This may be an indicator of cumulative resource usage by all service instances running on the server at any given timestamp. When resource usage metrics of a server are increasing in a next hour, a next minute or a next second, a higher value can be assigned to a server weight in the set of server weights (Sw) compared to other servers whose resource usage metrics are lower. When a server has a higher server weight value, this may indicate that resource usage will be higher on that server at a predicted timestamp.

The set of server weights (Sw) can be predicted by the trained machine learning model using resource usage telemetry data of a service instance acquired from the metric collector/database 521. Any one or more of the following resource usage telemetry metrics can be used to predict the set of server weights (Sw):
1 CPU Usage: Measured as a percentage
2 Network Usage: Measured as a percentage
3 DPU Usage: Measured as a percentage
4 Jumbo packets
5 ECMP usage percentage
6 Elephant flows
7 Mice flows
8 Traffic leaving DC
9 Encrypted traffic %
10 Compressed traffic %
11 Number of firewall rules
12 Network Latency: as milliseconds
13 Network Packet Loss: as percentage
14 Network Throughput: as bps

TABLE 1

| Time* | Day (N-2) | | | Day (N-1) | | | Day N | | |
|---|---|---|---|---|---|---|---|---|---|
| | CPU Usage | DPU Usage | Network Usage | CPU Usage | DPU Usage | Network Usage | CPU Usage | DPU Usage | Network Usage |
| t + Dt1 | 3 | 2 | 4 | 2 | 4 | 1 | 3 | 4 | 2 |
| t + Dt2 | 12 | 8 | 7 | 13 | 6 | 8 | 11 | 7 | 6 |
| t + Dt3 | 7 | 5 | 6 | 5 | 7 | 4 | 6 | 5 | 5 |

'*'-> Time is relative to start time of service instance.
Note:
To simplify, this table only shows the learning process for some of the metrics. The same process can be applied to a different set of metrics in various examples.

Table 1 shows a resource usage pattern of a service. After obtaining forecasted values of resource usage metrics of a service/application at different timestamp values relative to start timestamp of service, a weight fraction can be calculated for each individual metric. For example, a 100% CPU usage metric may contribute 20% and a 100% DPU usage metric may contributes 40% to an application weight of the set of application weights (Aw). The CPU usage metric value of 30% may contribute 0.06 to the application weight, 15 Jitter: as milliseconds As shown in FIG. 10, metric values for a present day can be forecast using metric values of a last two days. To simplify, the learning and prediction process for a few illustrative metrics is shown. This process can be applied to any additional metrics as well. FIG. 10 shows an illustrative resource utilization pattern on a DPU (such as the first DPU 511). The metric data of last 2 days indicates that CPU, network and DPU usage and request rate values are high towards the end of the day, so aprobability of the machine learning model predicting higher values for these metrics is high.

An example mathematical model for a metric value predictor machine learning model is:

$$MV(t)=a+W1*MV(t-1)+\ldots+Wp*MV(t-p)+e(t)$$

Where:
MV is Metric Value at future time t
a is constant
W1 & Wp are co-efficient values
p is number of past values of metric
e(t) is error correction at time t After obtaining forecasted values of resource usage metrics of a server at different timestamp values, a weight fraction can be calculated for each individual metric. For example, assume that a 100% CPU usage metric contributes 20% and a 100% DPU usage metric contributes 40% to a server weight. The CPU usage metric value of 30% can contribute 0.06 to the server weight and 40% DPU Usage can contribute 0.2 to the server weight.

$$\text{Server Weight for Metric}(AWmx)=(\text{Metric Value}*\text{Metric Weight Factor})/100,$$

where
Metric Value is predicted value of a metric
Metric Weight Factor is user adjusted or configured fraction between 0 and 1.

One may take a mean of predicted weights as a weight of a server:

$$\text{Server Weight}(Aw)=(\Sigma^n AWmx1+AWmx2+\ldots AWmxi)$$

The edge services platform 725 can schedule a service based on the calculated set of server weights (Sw) and the calculated set of application weights (Aw). In one embodiment, the edge services platform 725 schedules a service with a high Aw onto a server with a high Sw. Accordingly, a service requiring high resources can be deployed on a server having more resources.

FIG. 11 shows a server and application weight matrix for multiple data processing units of servers at each of a plurality of different time stamps. A second instance 'S2-2' of a second service S2 can be scheduled to the third DPU 513 instead of the first DPU 511. That is because the third DPU 513 has a highest server weight complementing a higher application weight Aw of the second service S2-2 at the time of scheduling of S2-2.

Figure 8:
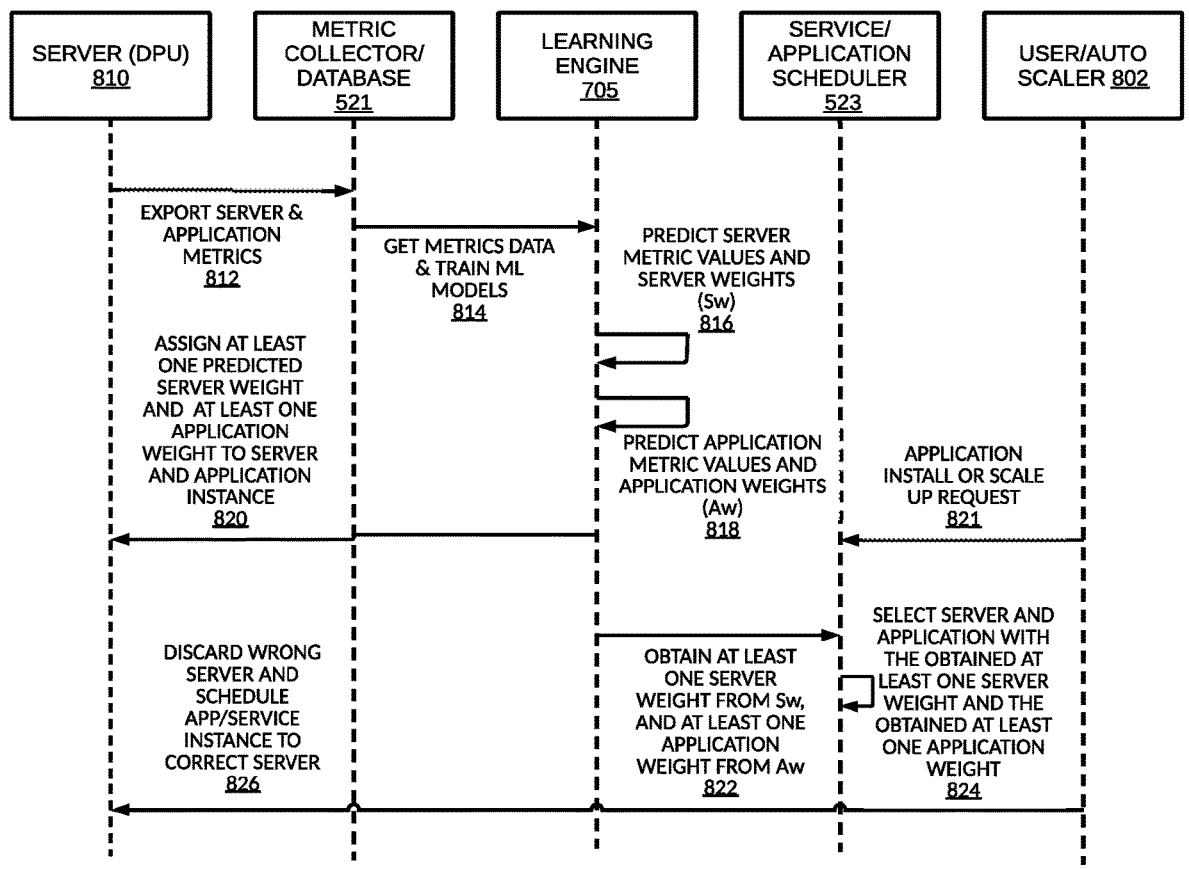
FIG. 8 is a data flow diagram illustrating an example method for scheduling one or more services to one or more servers, according to techniques of this disclosure.

FIG. 8 is a data flow diagram illustrating an example method for scheduling one or more services to one or more servers, according to techniques of this disclosure. At step 812, the metric collector/database 521 receives server and application metrics from a server 810. At step 814, the learning engine 705 trains the machine learning model using one or more metrics obtained from the metric collector/database 521. The learning engine 705 predicts server metric values and the set of server weights (Sw) at step 816. The learning engine 705 predicts application metric values and computes a set of application weights (Aw) at step 818. The learning engine 705 assigns predicted server weights of the set of server weights (Sw) to corresponding servers and predicted application weights of the set of application weights (Aw) to corresponding application instances at step 820. At step 822, the service/application scheduler 523 obtains at least one server weight of the set of server weights (Sw), and at least one application weight of the set of application weights (Aw), from the learning engine 705. At step 824, the service/application scheduler 523 selects a server and an application/service instance using the at least one server weight and the at least one application weight. An optional prior selection of a wrong server may be discarded, and an application/server instance is scheduled by the learning engine 705 to the correct server at step 826.

Figure 9:
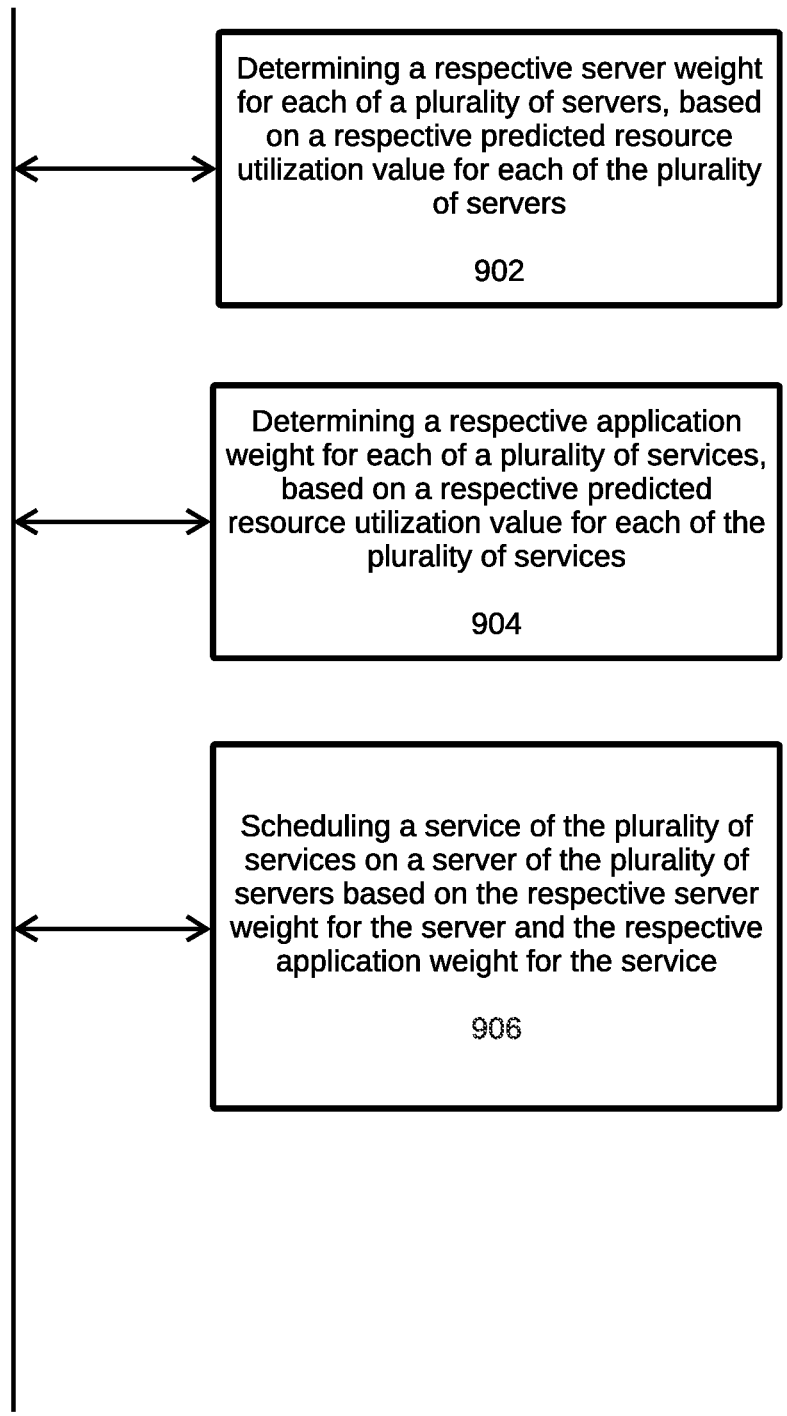
FIG. 9 is a flowchart for an example method performed by an edge services controller according to techniques of this disclosure.

FIG. 9 is a flowchart of an example method performed by an edge services platform controller 725 (FIG. 7) according to techniques of this disclosure. At block 902 (FIG. 9), a respective server weight is determined for each of a plurality of servers, based on a respective predicted resource utilization value for each of the plurality of servers. At block 904, a respective application weight is determined for each of a plurality of services, based on a respective predicted resource utilization value for each of the plurality of services. At block 906, a service of the plurality of services is scheduled on a server of the plurality of servers based on the respective server weight for the server and the respective application weight for the service.

Like reference characters denote like elements throughout the description and figures.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache). The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A system comprising:
   a plurality of servers, wherein each server of the plurality of servers comprises a network interface card (NIC) of a plurality of NICs, and wherein each NIC of the plurality of NICs comprises a processing unit; and
   an edge services controller configured to:
      for each server of the plurality of servers, determine, based on a predicted resource utilization value for the processing unit of the NIC of the server, a server weight;
      for each service of a plurality of services, determine, based on a predicted resource utilization value for the service, an application weight for the service; and
      schedule a service of the plurality of services on the processing unit of the NIC of a server of the plurality of servers based on the server weight for the server and the application weight for the service.

2. The system of claim 1, wherein the edge services controller is further configured to:
   receive historical usage data for the plurality of servers and the plurality of services; and
   process the historical usage data to train a machine learning model.

3. The system of claim 2, wherein the trained machine learning model is configured to:
   predict the resource utilization value for the processing unit of the NIC of each server of the plurality of servers at each time of a plurality of times; and
   predict the resource utilization value for each service of the plurality of services at each time of the plurality of times.

4. The system of claim 2, wherein the edge services controller is further configured to iteratively train the machine learning model with a current resource utilization value for the processing unit of the NIC of each server of the plurality of servers and with a current resource utilization value for each service of the plurality of services.

5. The system of claim 1,
   wherein the plurality of servers comprises a first server and a second server, and
   wherein to schedule the service, the edge services controller is configured to, based on the server weight for the first server, the server weight for the second server, and the application weight for the service:
      schedule a first instance of the service on the first server; and
      schedule a second instance of the service on the second server.

6. The system of claim 1, wherein to determine the application weight for each service of the plurality of services, the edges services controller is configured to:
   receive historical usage data associated with one or more of:
      a central processing unit (CPU) usage for each server of the plurality of servers,
      a memory usage for each server of the plurality of servers; and
      a network usage for each server of the plurality of servers; and
   determine the application weight for each service of the plurality of services as a function of the historical usage data.

7. The system of claim 1, wherein the edge services controller is further configured to determine a first weight fraction for CPU usage of the plurality of servers, a second weight fraction for memory usage of the plurality of servers, and a third weight fraction for network usage of the plurality of servers such that the first weight fraction, the second weight fraction, and the third weight fraction each define a contribution to an application weight for a service of the plurality of services.

8. The system of claim 1, wherein to determine the server weight for each server of the plurality of servers, the edge services controller is configured to determine a cumulative resource utilization by all service instances running on each server of the plurality of servers at any given timestamp.

9. The system of claim 1, wherein the edge services controller is further configured to predict the server weight for each server of the plurality of servers using a machine learning model that incorporates usage telemetry data of at least one service instance.

10. A method, comprising:
    for each server of a plurality of servers, determining, by an edge services controller based on a predicted resource utilization value for a processing unit of a network interface card (NIC) of the server, a server weight, wherein each server of the plurality of servers comprises a NIC of a plurality of NICs, and wherein each NIC of the plurality of NICs comprises a processing unit;
    for each service of a plurality of services, determining, by the edge services controller based on a predicted resource utilization value for the service, an application weight for the service; and
    scheduling, by the edge services controller a service of the plurality of services on a processing unit of the NIC of a server of the plurality of servers based on the server weight for the server and the application weight for the service.

11. The method of claim 10, further comprising:
    receiving, by the edge services controller, historical usage data for the plurality of servers and the plurality of services; and
    processing, by the edge services controller, the historical usage data to train a machine learning model.

12. The method of claim 11, further comprising:
    predicting, by the trained machine learning model, the resource utilization value for the processing unit of the NIC of each server of the plurality of servers at each time of a plurality of times; and
    predicting, by the trained machine learning model, the resource utilization value for each service of the plurality of services at each time of the plurality of times.

13. The method of claim 12, further comprising iteratively training, by the edge services controller, the trained machine learning model with a current resource utilization value for the processing unit of the NIC of each server of the plurality of servers and with a current resource utilization value for each service of the plurality of services.

14. The method of claim 10,
    wherein the plurality of servers comprises a first server and a second server, and
    wherein scheduling the service comprises, based on the server weight for the first server, the server weight for the second server, and the application weight for the service:
       scheduling, by the edge services controller, a first instance of the service on the first server; and
       scheduling, by the edge services controller, a second instance of the service on the second server.

15. The method of claim 10, wherein determining the application weight for each service of the plurality of services comprises:
  receiving, by the edge services controller, historical usage data associated with one or more of:
    a central processing unit (CPU) usage for each server of the plurality of servers,
    a memory usage for each server of the plurality of servers; and
    a network usage for each server of the plurality of servers; and
  determining, by the edge services controller, the application weight for each service of the plurality of services as a function of the historical usage data.

16. The method of claim 15, wherein the service of the plurality of services is associated with a first timestamp corresponding to a start of the service, and wherein the method further comprises applying, by the edge services controller, a vector autoregression machine learning model to the historical usage data to generate a value, for a second timestamp following the first timestamp, for one or more of:
  the CPU usage for each server of the plurality of servers;
  the memory usage for each server of the plurality of servers; and
  the network usage for each server of the plurality of servers.

17. The method of claim 10, further comprising determining, by the edge services controller, a first weight fraction for CPU usage of the plurality of servers, a second weight fraction for memory usage of the plurality of servers, and a third weight fraction for network usage of the plurality of servers such that the first weight fraction, the second weight fraction, and the third weight fraction each define a contribution to an application weight for a service of the plurality of services.

18. The method of claim 10, wherein determining the server weight for each server of the plurality of servers comprises determining, by the edge services controller, a cumulative resource utilization by all service instances running on each server of the plurality of servers at any given timestamp.

19. The method of claim 10, wherein predicting the server weight for each server of the plurality of servers comprises using, by the edge services controller, a machine learning model that incorporates usage telemetry data of at least one service instance.

20. A non-transitory computer-readable medium storing instructions that, when executed by processing circuitry, cause the processing circuitry to:
  for each server of a plurality of servers, determining, based on a predicted resource utilization value for a processing unit of a network interface card (NIC) of the server, a server weight, wherein each server of the plurality of servers comprises a NIC of a plurality of NICs, and wherein each NIC of the plurality of NICs comprises a processing unit;
  for each service of a plurality of services, determining, based on a predicted resource utilization value for the service, an application weight for the service; and
  scheduling, a service of the plurality of services on a processing unit of the NIC of a server of the plurality of servers based on the server weight for the server and the application weight for the service.

* * * * *